United States Patent Office 3,392,512
Patented July 16, 1968

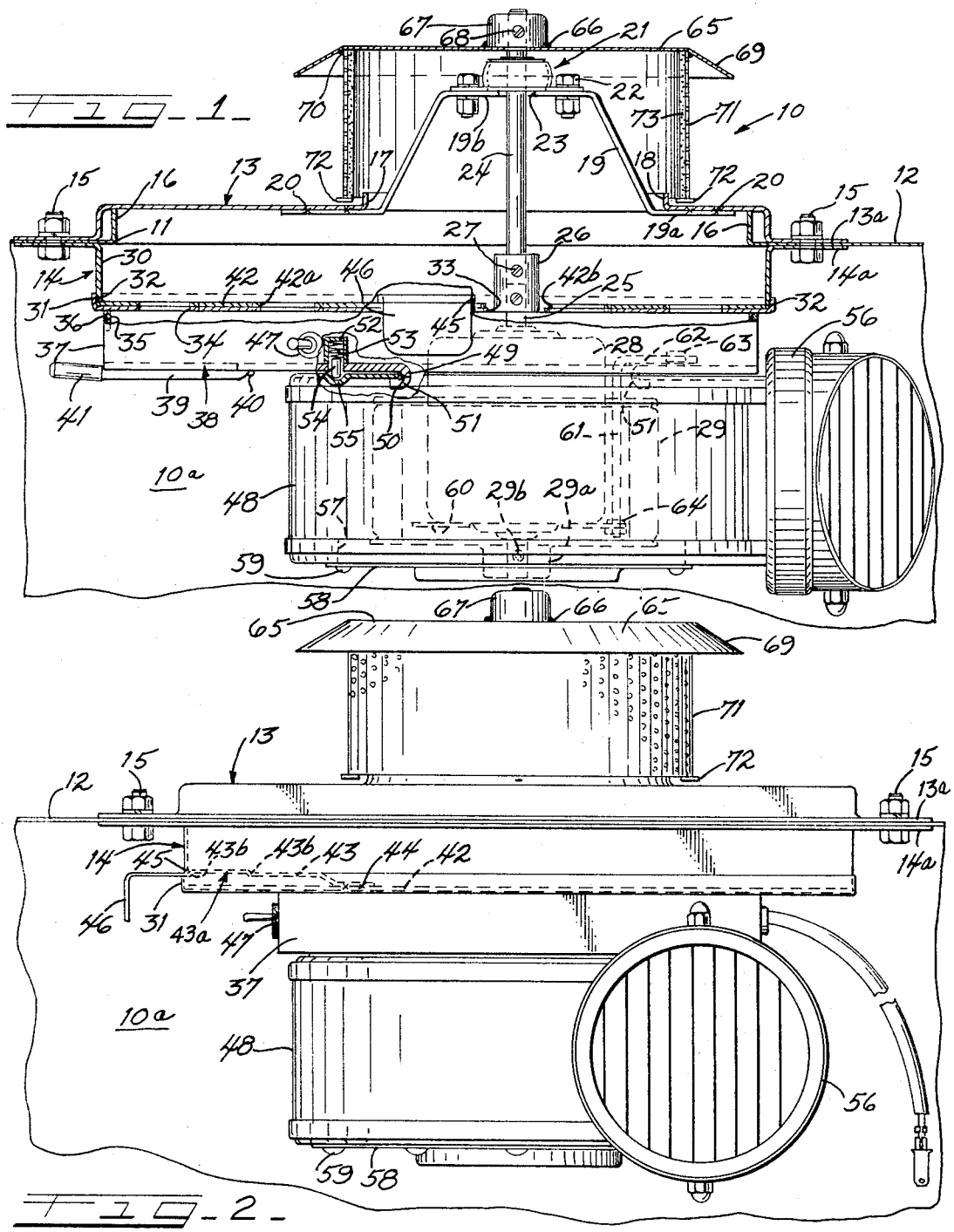

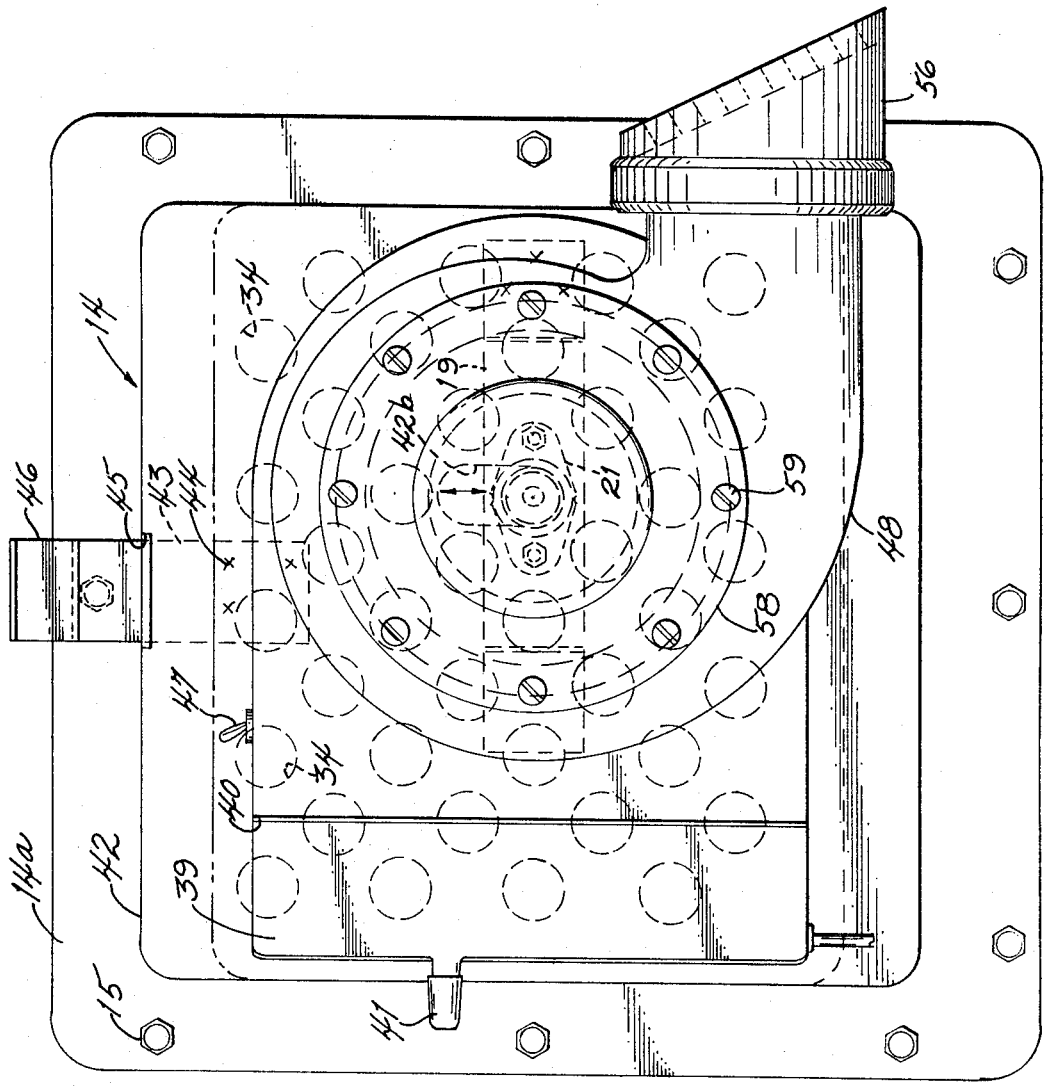

3,392,512
ROTARY FILTER AND FAN FOR CAB
Walter T. Ziolko, Willow Springs, and Rudolph A. Holmberg, Clarendon Hills, Ill., assignors to International Harvester Company, Chicago, Ill., a corporation of Delaware
Filed Oct. 27, 1966, Ser. No. 589,894
8 Claims. (Cl. 55—400)

ABSTRACT OF THE DISCLOSURE

The combination of an air cleaning means with an electric motor wherein the air cleaning means is rotatably mounted exteriorly of the compartment and exposed to the atmosphere, said cleaning means including a cylindrical sleeve-like perforated member and a layer of filtering material disposed in closely abutting relation with the inner surface of said perforated member and having a radial means for preventing the entry of air to the interior of the compartment except through the filtering elements.

---

This invention relates to air moving apparatus, but more particularly to a combination air filtering and fan unit adaptable for use in an enclosed compartment such as a vehicle operator's cab.

Heretofore cab pressurizer units have been provided in the operator's cab of a vehicle used in agricultural ground working operations in order to permit operating the vehicle with the windows of the cab closed thus providing some measure of protection and comfort for the operator against the ravages of the dust, dirt and chaff particles and other extraneous materials so commonly encountered in the air during such operations. In one of the well known type cab pressurizer units presently employed the outside air entering the cab is filtered by passing it through a dry, mat type filtering element generally of Scott Foam material. Because of the highly contaminated nature of the atmosphere in which a vehicle of the type envisaged herein operates the filter rapidly becomes clogged thus requiring frequent replacement of the filtering element, sometimes at two hour intervals. The inconvenience and drawback of such a practice is readily apparent and it will be appreciated the use of such a unit, of course, poses a problem that prior to the present invention had not been satisfactorily resolved.

It is a principal object therefore of the present invention to provide an improved combination fan and filtering compartment pressurizer unit that overcomes the aforementioned shortcomings of such units.

Another object is to provide an improved rotary type air cleaning device.

A further object is to provide a vehicle cab pressurizer unit having a rotating air filtering means operatively driven by the fan motor of the pressurizer unit.

A still further object is to provide a novel rotatable air cleaning means wherein a generally cylindrically shaped perforated member is backed up with a dry mat type filtering material fashioned as a pad or bed and disposed in close fitting relation to the interior surface of the perforated member and arranged so that air flow passes therethrough in a radial direction first through the perforated member and subsequently through the filtering material.

A yet still further object is to provide an improved means for filtering out chaff and dirt particles from the atmosphere and wherein the filtering means is disposed exteriorly of the supporting unit so as to facilitate cleaning, removal and replacement of the associated filtering element.

Further objects and advantages of the present invention will be apparent from the full description, reference being had to the accompanying drawings wherein a preferred form of the present invention is clearly shown.

FIGURE 1 is a front elevational view, with portions thereof broken away and shown in section, of a cab pressurizer unit that incorporates the present invention therein;

FIGURE 2 is a side elevational view of the unit shown in the preceding view; and, FIGURE 3 is a plan view looking upwardly from the bottom toward the top of the unit shown in FIGURE 1.

Referring now to the drawings it will be seen that the unit selected for illustrating one preferred application of the present invention comprises a compartment pressurizer unit, indicated generally by the reference numeral 10, which is adapted for mounting, preferably, in the ceiling or roof of an enclosed compartment such as the vehicle operator's cab indicated fragmentarily at 10a. An opening 11 in the roof structure 12 of the cab of the vehicle (not shown) has positioned therein an upper generally square-shaped exterior cover or housing portion 13 and a lower generally square-shaped interior housing portion 14 with peripherally extending flanges 13a and 14a on the respective housing portions 13, 14 which flanges are disposed on opposite sides of the roof member 12 and are secured together therewith by suitable fasteners, such as the bolt and nut means indicated at 15. An upturned lip 16 on the edge of roof opening 11 may be provided to aid in positioning the unit and in sealing said opening against the ingress of moisture or the like therein.

The upper housing portion 13 has an opening 17 therein with an upturned lip 18 around the edge thereof, and a somewhat U-shaped bracket 19 positioned in said opening has the opposite legs 19a, 19a affixed to the interior of said housing by suitable securing means such as the welds indicated at 20. A cross member 19b of said bracket has mounted thereon a journalling sealed bearing shown generally at 21 which may be fixedly secured to said cross member by suitable securing means such as the bolt and nut fasteners indicated at 22. An opening 23 in the cross member 19b of bracket 19 is dimensioned to comfortably accommodate for rotation therewithin a shaft 24 which is rotatably mounted in bearing 21 and extends in opposite directions therefrom.

Shaft 24 may be connected to a shaft 25 by a coupling connector 26 and secured thereto by suitable fastening means such as the set screws 27. Shaft 25 is constituted as a portion of an electric motor 28 which operates a conventional centrifugal type blower fan 29 mounted on one end of said motor shaft by the hub 29a and set screw 29b therein.

The lower housing portion 14 as constituted may comprise a wall portion 30 depending from the flange 14a to a shallow pan-like member 31 having an upturned edge which overlaps said wall portion and is secured thereto by suitable means such as the spot welds indicated at 32. An opening 33 in member 31 accommodates motor shaft 25, and a plurality of perforations such as 34 in said member are provided for a purpose to be hereinafter discussed.

Depending from the member 31, of lower housing 14, is a peripherally extending rim or lip 35 which may be affixed to said pan-like member by any suitable means (not shown), or, if desired, fashioned integral therewith without deviating from any of the teachings hereof. Overlapping rim 35 and secured thereto by conventional means, such as the welds indicated at 36, is a diverter chamber housing 37 having an opening 38 therein that is covered by a door panel 39 pivotally mounted by a conventional hinge 40 that is spring loaded to maintain said door panel selectively in an opened or closed position.

A door operating handle 41 may be provided to facilitate opening and closing said door panel as desired.

A perforated panel or plate-like damper member 42 having openings 42a and a slot-like opening 42b therein is slidably disposed in juxtaposition above the perforated pan-like stationary member 31 in the lower housing portion 14 with the perforations in the adjacent members being registerable to permit the flow of air therethrough, or of being disposed out of registration to provide a damper that blocks the flow of air therethrough as will subsequently be further discussed. An operating extension link 43, affixed as by welding or the like at 44 to plate 42 (FIG. 2), extends through an opening 45 in housing 14 and has the outwardly extending end thereof overturned to provide handle means 46 for slidably moving said plate to effect registration or non-registration of the perforations in the plate with those in the member 31. The operating extension member 43 has a raised portion 43a therein that is spring loaded upwardly so that opposite ends 43b, 43b of said raised portion function as detent notches cooperating with the upper edge of opening 45 to delimit the lateral movement positions of the slidable damper plate 42.

It is understood of course suitable electric wiring connections will be provided along with a source of electrical power for operating the motor 28 which may be controlled by a conventional high-low and off switch 47 suitably mounted in a convenient location, such as shown, in the diverter chamber housing 37.

A volute scroll housing 48 depends from diverter chamber housing 37 and may be rotatably affixed thereto in the following manner. An opening in the horizontal wall of housing 37 has the edge thereof rolled over to provide a periferally extending lip 49 (FIG. 1) while an opening 50 in scroll housing 48 is dimensioned to fit around said lip. A plurality of tabs 51 (only two of which are shown) distributed peripherally around said lip depend therefrom and are bent back to supportably accommodate the scroll housing in a slidable relation thus permitting the latter to be rotated for purposes of selectively directing the air discharged therefrom.

A plurality of detent mechanisms (only one of which is shown), distributed circumferentially around housing 37 in the vicinity of the opening therein, may each include a raised hump or indent portion 52 that encloses a spring 53 which acts against a pin or plunger member 54 that engages an aligned detent recess 55 in the scroll housing 48. As is well understood these detents may be used to index the rotative position of the housing 48.

A vaned deflector 56 may be suitably mounted on the discharge outlet of the scroll housing 48 and adapted for rotation thereabout by conventional means (not shown) so as to permit directing the air discharged therefrom into a plurality of selected directions as desired. An access opening 57 in the lower wall of housing 48 may be closed by a cover 58 by suitable fastening screws such as 59.

The motor 29 may be provided with a plate 60 suitably affixed to the bottom end of the motor for the support thereof. A plurality of support stringers 61 (only one of which is shown) have an upper end thereof bent over to provide a hook-like portion 62 that is secured in place by a clamp 63 fixedly mounted on the housing 37. The opposite end of each said stringer is threaded and inserted through an opening in the plate 60 and a pair of threaded nuts 64 are provided to fasten the respective stringer to the motor plate 60 thus providing an effective means for rigidly supporting the motor 28.

Now in accordance with the more specific teachings of the present invention there is provided a generally circularly-shaped cap or cover-like member 65 which may be positioned over the outwardly extending end of shaft 24 and affixed, by suitable means such as the welds 66, to a collar 67 mounted on said shaft and constrained for rotation therewith by suitable means such as the set screw 68. The outer edge of the cap or cover 65 may be downwardly turned to provide a somewhat conical shaped edge portion 69 that may function somewhat as a rain cap or protective covering. Affixed to the cap 65 as by the welds 70 is a perforated sheet or screen-like foraminous member 71 which is generally cylindrical or drum shape, while a plurality of radially directed vane-like elements 72 are circumferentially spaced around the lower edge of member 71 and affixed thereto by any suitable means, provides a form of auxiliary fan for preventing the ingress of outside air around the lower edge of member 71 as well as a support for a generally cylindrically shaped liner-like filtering element 73 disposed interiorly of said perforated member. The vane-like elements 72, preferably, are closely spaced to the top surface of housing 13 so as to limit the movement of air therethrough while still providing adequate clearance when said elements rotate with shaft 24.

The sleeve-like perforated member 71 may be fashioned from any suitable material and in any one of a plurality of perforated or foraminous arrangements, including a wire screen type of element. However, a preferred element for this purpose is fashioned from a perforated metallic material coated with a layer of material of the type commonly referred to on the commercial markets as Teflon or the equivalent thereof. Although the size of the perforations in the member 71 may vary according to conditions of the particle laden air to be cleaned it is believed that perforations of the order of $3/16''$ in diameter will be satisfactory although such dimension is not intended to be a limiting factor herein. The filtering element 73 may, of course, be fashioned from any well known suitable filtering material such as felt, paper, mineral or glass fibers or any other material suitable for the filtering function to be performed and capable of being formed into a bed of cylindrical or drum shape and having sufficient rigidity or resiliency to support itself as a liner in the environment proposed. One preferred material believed suitable for the purpose is known commercially as Scott Foam. Replacement of said liner-like filtering element may be readily effected by slightly deforming or collapsing the element to permit slipping it over the ledge or shoulder support after the cap or cover has been removed from the shaft 24.

*Operation*

With the fan operating the external dirt and chaff-laden air strikes the rotating perforated member 71 whereupon the heavier particles are brushed or washed away by the rotating action of said member and prevented from passing through the perforations therein while a portion of the smaller and lighter particles may be passed therethrough into the filtering element 73 where they are lodged and thus removed from the air stream passing therethrough. The cleaned air then flows down-stream into the housing chamber and through the registering openings in the sliding damper plate 42 and its cooperating stationary perforated plate member 31 into the diverter housing chamber 37, it being assumed, of course, the damper plate 42 is positioned to its open position to permit passage of air therethrough. From the diverter chamber the clean air is drawn through the blower fan 29 and directed by way of the scroll 48 and vaned deflector 56 into the associated enclosed compartment or the vehicle operator's cab.

In the event it is desired to recirculate the air in the enclosed compartment or the vehicle operator's cab without bringing in additional outside air damper 42 is moved to its closed position, with the perforations 42a therein disposed out of registration with the perforations 34 in adjoining member 31, and the diverter chamber door 39 is opened thereby permitting recirculation of the air within said compartment or cab.

From the above it will be seen that the proposed air cleaning arrangement provides a highly effective means for removing dust and chaff from the air prior to entering an enclosed compartment, and one that is particularly useful under conditions where large concentrations of chaff-laden air are encountered. It will be seen also that rotation of the air cleaning or filtering means as proposed herein facilitates keeping said means clean and thus helps to preserve the useful life of the filtering material thereof. The centrifugal force resulting from rotation of the filtering means is effective for throwing away the heavier extraneous particles carried in the air stream while the lighter particles which may occasionally accumulate to form larger and heavier particles on the outer surface of the perforated element will eventually be thrown off or removed from said element by centrifugal force as said element is rotated by the fan motor. Furthermore, with the proposed arrangement the filtering element may be removed for replacement or cleaning exteriorly of the cab or compartment thus eliminating the possibility of spillage of the accumulations therein around the interior thereof.

What is claimed is:

1. In an air cleaning and circulating apparatus including a housing having an air intake opening therein with the housing adapted to extend through an opening in a wall of an enclosed compartment in which the air is circulated, and electric motor driven blower fan in the housing discharging the output thereof into the enclosed compartment, and air flow damper means operable to restrict the flow of air into the housing from a space exteriorly of the enclosed compartment, the combination therewith of air cleaning means disposed adjacent and covering the intake opening of said housing and exteriorly of said enclosed compartment, and means rotatably mounting said air cleaning means on the housing including drive means operably connected to and for rotation by the electric motor of said electric motor driven blower fan, said air cleaning means including a cylindrical sleeve-like perforated member disposed for exposure to suspend particle-laden air, and an element comprising a layer of filtering material disposed in closely abutting relation with a downstream surface of said perforated member, said perforated member having a plurality of radially directed and circumferentially spaced vane elements affixed to an end edge adjacent the housing whereby upon rotation of the air cleaning means said vane elements create an operative flow of air away from the air intake opening thereby preventing air from entering the compartment except through a filter element, the flow of air acting as a sealing element.

2. A device as recited in claim 1 wherein said air cleaning means is exposed directly to the atmosphere.

3. The invention according to claim 1 but further characterized in that the means rotatably mounting said air cleaning means includes a support fixedly mounted on the housing and extending into the air intake opening of said housing and having a sealed bearing securely mounted thereon journalling a shaft drivingly coupled to the electric motor of said electric motor driven blower fan for rotation therewith, and further in that a collar member mounted on said shaft and constrained for rotation therewith has a radially extending cover member fixedly secured thereto that supportably carries the said perforated member and filtering element for rotation with the shaft.

4. The invention according to claim 3 wherein the outer edge of said radially extending cover member is overturned to provide a generally conical-shaped protective portion overhanging said perforated member and filtering element.

5. The invention according to claim 3 but further characterized in that in said air cleaning means the perforated member is fashioned as a thin sheet of rigid material and the filtering element comprises a layer of a porous dry mat air filtering material.

6. The invention according to claim 3 but further characterized in that in the said air cleaning means the perforated member is fashioned from a thin sheet of rigid metallic material and covered with a thin layer of Teflon material and the filtering element is fabricated as a layer of Scott Foam material.

7. The invention according to claim 3 and further characterized in that the perforated member has an outwardly exposed surface that is disposed normal to the incoming air flow, and further in that the air flow after passing through the perforated member and filtering element is directed in the housing in an axial flow relation paralleling the axis of rotation of the air cleaning means.

8. The invention according to claim 7 wherein the enclosed compartment comprises a vehicle operator's cab.

References Cited

UNITED STATES PATENTS

| 2,213,016 | 8/1940 | Perkins | 55—481 X |
| 2,502,214 | 4/1950 | Schrum | 55—498 X |
| 2,537,278 | 1/1951 | Patterson | 55—481 X |
| 2,729,436 | 1/1956 | Norris. | |
| 2,954,091 | 9/1960 | McMichael | 55—510 X |
| 2,966,960 | 1/1961 | Rochlin. | |
| 2,970,669 | 2/1961 | Bergson. | |
| 3,018,896 | 1/1962 | Gewiss | 55—400 X |
| 3,107,987 | 10/1963 | Duer | 55—404 X |
| 3,212,239 | 10/1965 | Maestrelli | 55—400 X |
| 3,289,393 | 12/1966 | Spotta | 55—302 |

FOREIGN PATENTS

| 883,515 | 3/1943 | France. |
| 717,848 | 11/1954 | Great Britain. |

HARRY B. THORNTON, *Primary Examiner.*

S. W. SOKOLOFF, *Examiner.*

B. NOZICK, *Assistant Examiner.*